Jan. 6, 1970    L. A. MITTEN    3,487,866
PRODUCTION OF LUMBER AND PULP CHIPS FROM SMALL-DIAMETER LOGS
Filed Aug. 8, 1966    2 Sheets-Sheet 1
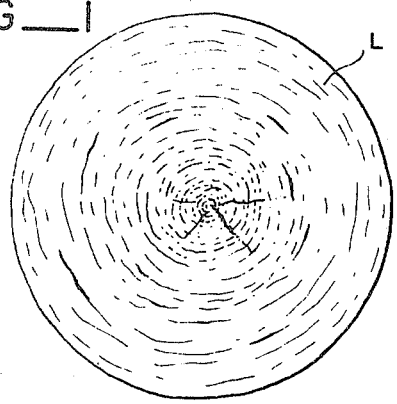
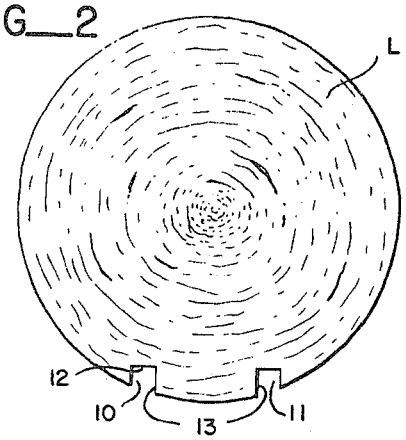
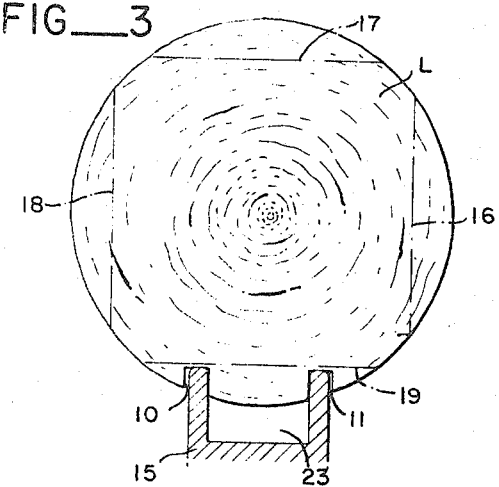
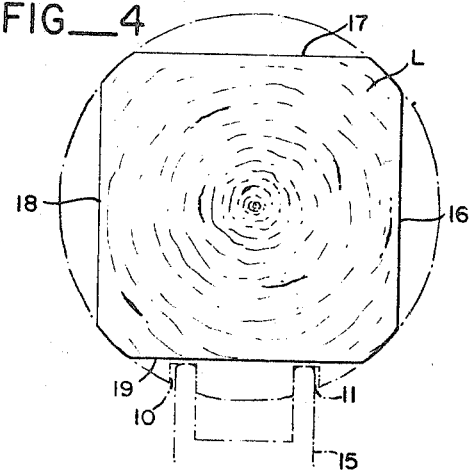
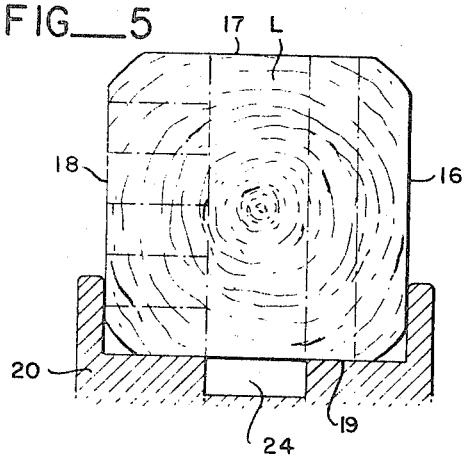
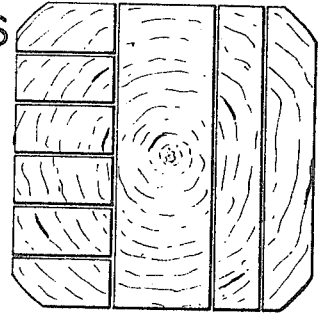
INVENTOR.
LEONARD A. MITTEN
BY
ATTORNEYS Jan. 6, 1970     L. A. MITTEN     3,487,866
PRODUCTION OF LUMBER AND PULP CHIPS FROM SMALL-DIAMETER LOGS
Filed Aug. 8, 1966     2 Sheets-Sheet 2
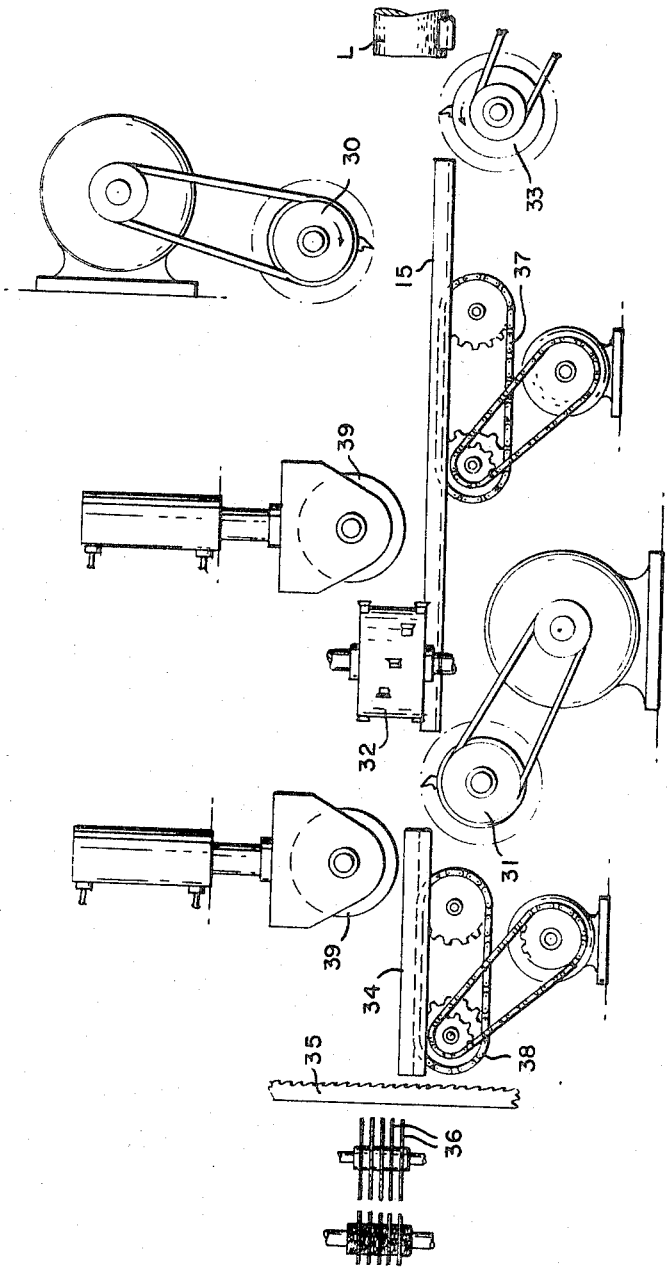
INVENTOR.
LEONARD A. MITTEN
BY
ATTORNEYS United States Patent Office 3,487,866
Patented Jan. 6, 1970

3,487,866
PRODUCTION OF LUMBER AND PULP CHIPS
FROM SMALL-DIAMETER LOGS
Leonard A. Mitten, Vancouver, British Columbia, Canada, assignor to Ernest E. Runnion, Shelton, Wash.
Filed Aug. 8, 1966, Ser. No. 571,061
Int. Cl. B27b 1/00, 33/00
U.S. Cl. 144—312
13 Claims

ABSTRACT OF THE DISCLOSURE

This disclosure relates to a means and method of processing small-diameter logs to obtain therefrom dimensional lumber and pulp chips, with (1) the dimensional lumber ideally representing substantially a theoretical maximum of such content of the log as is capable of being cut into lumber, and (2) the pulp chips being obtained from exterior sections of the log incident to profiling the log to reduce the same to a cant from which said lumber is sawed.

---

In its preferred embodiment, the method of said patent involves the steps of conveying the log along a lineal travel path through a succession of localized cutting stations, and as the log traverses such stations in course of said conveyed travel first subjecting the log to the action of cutter heads to profile the same into a cant faced about the perimeter by meeting flats which lie at right angles, one flat to adjacent flats, and then producing dimensional is in fact vital if the end product of the process is to be lumber from the profiled log by the action of saws which cut in selected planes paralleling the flats. The cutter heads produce chips, and in order that these chips will be suitable for a high-grade pulping operation the cutter heads turn in a "climb-cut" direction, namely in the direction of the log travel.

It is perforce desirable that the chip-profiling of the log be so performed that the meeting flats which the profiling produces lie exactly at right angles to one another. This is kept within the tolerance limits prescribed for #1 dimension lumber. In the method of the above-identified patent the produced flats, immediately following their inception and throughout at least the duration of the profiling action, function as guide surfaces to maintain the conveyed log against either deviating from a linear travel endwise to its axis or turning about said axis.

The object of the present invention is to provide a perfected method of profiling a log to produce a cant suitable for the production of dimensional lumber, and one particularly characterized in that the log is not only effectively guided as soon as the flats take shape but also before and during the period when the shaping of the flats is initiated.

This and other more particular objects and advantages in view will appear and be understood in the course of the following description and claims.

Description of drawings

In the accompanying drawing:
FIGURES 1 through 6 indicate successive procedural steps which are practiced in the processing of a log according to the teachings of the present invention.

FIG. 7 is a schematic side elevational view representing a mill incorporating suitable structure to perform said steps.

Description of invention

For purposes of the present description let it be assumed that the log to be processed has a 12" diameter and that the cant into which it is to be profiled has a square shape considered in cross-section. To perform this profiling step four cutter heads are or may be employed, each functioning to remove a respective segmental portion of the log. The heads occupy a station or stations traversed by the log as it is conveyed along a linear travel path and desirably are mounted in pairs, opposingly mounted as between the two heads of each pair to have one pair 30–31 produce flats upon the top and bottom sides of the log and the other pair 32—32 produce flats upon the two flanking sides of the log, the said top and bottom flats paralleling one another and the flanking flats lying normal thereto. The cutter heads turn in a "climb cut" direction, namely in the direction of the log's travel, so that the wood removed is in the form of chips suitable for the digesting process of a high-grade pulping operation. The chips are projected from the heads into chutes which funnel the same either directly into a receiving bin or onto a chip conveyor which carries the same to a bin.

According to the present invention the log, denoted by the letter L, at a stage of its conveyed travel represented by FIG. 2 traverses a kerfing cutter head 33 in advance of its traversal of the described profiling heads. Similarly rotating in a "climb-cut" direction to obtain pulp chips by its cutting action, this kerfing head produces along the bottom side of the log two grooves 10 and 11 equidistantly spaced from opposite sides of a vertical plane extending longitudinally on a diameter of the log. Moderately wide, these grooves present a flat head wall 12 and a planar inner wall 13. For a purpose which will hereinafter appear the depth of cut made by the kerfing cutter head is somewhat less than the depth of cut made by the profiling cutter head which, at a later stage (FIG. 4) of the log's travel, removes the bottom segment from the log. Ideally, the difference in cutting depth approximates the depth of chip which is being cut.

Positioned to have its rear end lie immediately to the front of the station occupied by the kerfing cutter head, there is provided (FIG. 3) a channel-shaped stationary shoe 15 formed so that the two tongues which form its side arms enter the grooves 10 and 11 and bear against the head walls 12, guiding the log as the latter now proceeds to and traverses the profiling stations.

The foregoing is not to say that such guide shoe 15 extends by its front end through and beyond the profiling stations. While it may extend beyond transverse vertical planes occupied by the cutter heads which profile the flanks and the top of the log, it perforce terminates short of the transverse vertical plane occupied by the cutter head which profiles the bottom. The shoe should be moderately long in order that it will prescribe for the log a non-deviating linear travel through all of the profiling heads. Having this length it is unimportant whether the front end extends beyond any of the profiling heads, and by such token it is unimportant to the present method the order in which the profiling heads perform their respective functions of forming the flats 16, 17, 18 and 19 upon the log.

Immediately beyond the profiling stations the now-profiled leading end of the log, having been divested of the several segments (including the bottom segment with its guide furrows 10 and 11), feeds onto a walk-way 34 formed by a channel-shaped shoe 20 which first acts as a complement to the guide shoe 15 and, as the trailing end of the log clears the latter shoe, takes over therefrom and guides the square cant through a following sawing station. In its progress through this sawing station, dimensional lumber is produced. Indicated by dotted lines in FIG. 5 are planes in which saws 35 and 36 occupying this station perform a sawing function to produce from the conveyed cant the dimensional lumber shown in FIG. 6. Assuming a log of the 12" diameter heretofore mentioned, such dimensional lumber may comprise, by way of example, six 2 x 4's, one 4 x 12, and two 2 x 12's.

It will be seen that I have shown the guide shoe 15 as providing an upwardly facing flat-bottomed channel-way 23 underlying the log, and the guide shoe 20 as having a more or less similar channel-way 24. Each may accommodate the upper run of a respective one of several endless conveyor chains, as 37 and 38, driven at corresponding speeds and responsible for moving the log through the several processing stations. Flights on the chains rise to a height sufficient to establish a purchase. Pressure rolls 39 bear from above upon the conveyed log to hold the same seated against the guides. It is self-evident, however, that power-driven knurled rollers like or similar to those shown in my pending application for Letters Patent of the United States filed Nov. 10, 1965, Ser. No. 507,111, now U.S. Patent 3,313,329 may be employed for the conveying function, either in lieu of or in conjunction with chains.

It is believed that the invention will have been clearly understood from the foregoing. I intend that no limitations are to be implied and that the hereto annexed claims be given the broadest interpretation to which the employed language fairly admits.

What is claimed is:

1. The method of mill processing a log for maximum commercial return, comprising conveying the log along a linear travel path through a succession of localized stations, at a first said station cutting in the peripheral region of the conveyed log two continuous longitudinally extending furrows, at a second said station located in immediate following relation to the first station employing said furrows as guide-ways to pilot the log through a third said station located in immediate following relation to the second station, at said third station subjecting the peripheral region of the log to the chipping action of cutter heads rotating in a climb-cut direction to produce pulp chips and by said chipping action removing the furrowed portion of the log incident to profiling the log to a progressively developing cant which is faced throughout the perimeter by horizontal and vertical flats lying normal one to the other, and at a fourth said station located in immediate following relation to said profiling station employing at each of the two sides of the conveyed cant an outwardly facing flat and a downwardly facing as guide surfaces to pilot the conveyed log, said piloting holding the conveyed log against either deviation from a linear travel endwise to its length or turning about said axis and being performed upon the log either by the furrows or the flats or both from approximately the inception of the furrow cuts throughout the duration of the profiling cuts.

2. The method claimed in claim 1 in which the furrows are located upon the underside one spaced to one side and the other spaced to the other side of the log's vertical diameter.

3. The method claimed in claim 1 characterized in that the profiling removes a segmental portion of the log from each of four quarter sections thereof to produce a cant which is rectangular in cross-section, both of the furrows being wholly contained within a single said removed segment of the log.

4. The method claimed in claim 3 in which said single segment lies at the underside of the log in a position bisected by the log's vertical diameter.

5. The method claimed in claim 2 in which the furrows are given substantial width so that the weight of the log can be sustained by having the head walls of the furrows rest upon wide guides which track in the furrow ways.

6. The method claimed in claim 1 in which the profiled cant is conveyed along a second linear travel path and in course of said latter travel sawed longitudinally on at least one plane which is spaced from and parallel with diametrically opposite flats of the cant, an outwardly facing flat and a downwardly facing flat upon each of the two sides of the cant being similarly employed as guide surfaces to pilot the cant from the point of inception of the sawing until the substantial completion thereof.

7. The method claimed in claim 6 in which the axes of the two said linear travel paths coincide.

8. The method claimed in claim 1 in which the cutting of the furrows is performed by cutter heads rotating in a climb-cut direction to produce pulp chips.

9. In a log-cutting machine, means for conveying a log along an established travel path, cutter means acting upon the conveyed log to progressively form in the underside thereof two furrows running the entire length of the log and spaced one to one side and the other to the other side of the log's vertical diameter, stationary tongues adapted to enter the developing furrows as soon as the same take shape to perform the function of guides piloting the log through a following stage of the conveyed travel, and cutter heads acting upon the conveyed log during said following stage of travel to remove the furrowed portion of the log incident to profiling the log to a progressively developing cant faced throughout the perimeter by meeting flats lying normal one flat to adjacent flats, said cutter heads rotating in a climb-cut direction so that the wood removed is in the form of pulp chips, a walk-away being provided on which the cant rides immediately following said profiling, to take over upon the profiled portion of the conveyed log the guiding function previously performed by the guide tongues upon the non-profiled portion, both the tongues and the walk-away positively holding the log against either deviating from a linear travel endwise to its axis or turning about said axis.

10. A log-cutting machine as claimed in claim 9 in which the two furrows are each contained in a segmental portion of the log whose chordal line defines the plane of one of said flats.

11. A log-cutting machine as claimed in claim 9, the planes in which the furrows lie being vertical.

12. A log-cutting machine as claimed in claim 11, the tongues having substantial width so as to provide a wide bearing surface at the top.

13. A log-cutting machine as claimed in claim 9, the cutter means which forms the furrows comprising cutter heads which also rotate in a climb-cut direction.

References Cited

UNITED STATES PATENTS

| 462,797 | 11/1891 | Hazard. | |
| 3,373,782 | 3/1968 | Pease | 144—326 |
| 3,259,157 | 7/1966 | Runnion | 144—312 |

DONALD R. SCHRAN, Primary Examiner

U.S. Cl. X.R.

144—41, 162